US005709894A

United States Patent [19]
Julien

[11] Patent Number: 5,709,894
[45] Date of Patent: Jan. 20, 1998

[54] FEED ADDITIVE FOR RUMINANT ANIMALS AND A METHOD FOR FEEDING A RUMINANT

[75] Inventor: William E. Julien, Omaha, Nebr.

[73] Assignee: Biovance Nebraska, Omaha, Nebr.

[21] Appl. No.: 486,226

[22] Filed: Jun. 7, 1995

[51] Int. Cl.$^6$ .................................. A23K 1/06; A23K 1/18
[52] U.S. Cl. ........................ 426/53; 426/2; 426/54; 426/31; 426/69; 426/52; 426/807
[58] Field of Search ............................ 426/53, 54, 2, 426/69, 31, 52, 807

[56] References Cited

U.S. PATENT DOCUMENTS

| | | | |
|---|---|---|---|
| 2,789,939 | 4/1957 | Kita . | |
| 3,639,210 | 2/1972 | Tanaka et al. | 195/28 R |
| 3,912,822 | 10/1975 | Yokotsuka et al. . | |
| 4,045,489 | 8/1977 | Zhdanova et al. . | |
| 4,334,020 | 6/1982 | Nakazawa et al. . | |
| 4,411,991 | 10/1983 | Hirakawa et al. . | |
| 4,800,088 | 1/1989 | Sawhill | 426/69 |
| 5,372,811 | 12/1994 | Yoder | 426/2 |

FOREIGN PATENT DOCUMENTS

| | | |
|---|---|---|
| 1222773 | 8/1962 | Germany . |
| 1222773 | 9/1996 | Germany . |
| 1 173923 | 7/1989 | Japan . |
| 3 277240 | 12/1991 | Japan . |
| 442947 | 2/1962 | Switzerland . |
| 442947 | 8/1967 | Switzerland . |

OTHER PUBLICATIONS

Stauffer Chemical Company, Maniferm, (Mar. 1997).
Ajinomoto, Proteferm Brochure (Mar. 1997).
IMC, Dyna–Ferm Brochure, 1950.
W.H. Hoover et al, "Effects of Differential Solid–Liquid Removal Rates on Protozoa Numbers in Continuous Cultures of Rumen Contents," J. Animal Sci., vol. 43, p. 528, 1976.
P.H. Robinson et al, "Influence of Declining Level of Feed Intake and Varying the Proportion of Starch in the Concentrate of Rumen Ingesta Quantity, Composition and Kinetics of Ingesta Turnover in Dailey Cows", Livestock Production Scient, 17 (1987), pp. 37–62.
A.M. Van Vuuren, "Effect of Level of Hay Intake, Method of Marker Adminstration and Stage of Lactation on Rate of Passage Through the Reticulorumen," Can. J. Anim. Sci. 64 (Suppl.): 80–81 (Sep. 1984).
Dyna–Ferm Product Brochure (Circa. 1950).
Proteferm Product Brochure.
Maniferm Product Brochure.
"Animal Foodstuffs Containing Glutamic Acid Ferment Residues" (Absract)*.
"Monosodium Glutamate as Feed Additives" (Abstract)*.
Association of American Feed Control Officials, "Feed Ingredient Definitions", 1992, pp. 147–148.
Randy Shaver and Ric Grummer, "Feeding and Management of the Close–Up Dry Dairy Cow", Proceedings of the 13th Western Nutrition Conference, Sep. 16–17, 1992, pp. 191–198.
Jesse P. Goff and Ronald L. Horst, "Anionic Salts Help Prevent Milk Fever", Hoard's Dairyman, Dec. 1992, p. 837.
S. A. Wandji et al, "Effects of intrahypothalamic injections of GABA, muscimol, pentobarbital, and L–glutamic acid on feed intake of satiated sheep", Can. J. Physiol. Pharmacol, 67, 5–9, (1989), pp. 5–9.
Robert H. Brown "Probing Byproducts for Feed Attracting Research Interest", Feedstuffs, Apr. 11, 1983, p. 35.
P.E. Colucci et al, "Feed Intake, Apparent Diet Digestibility, and rate of particulate passage in Dairy Cattle", J. Dairy Sci. 65: 1445–1456 (1982).
Kobayashi et al. Abstracted from JPO 03–277240 vol. 16, No. 93 (Mar. 1992).
Yamamoto Abstracted from JPO 01–20090 vol. 13, No. 199 (May 1989).

*Primary Examiner*—David L. Lacey
*Assistant Examiner*—Choon P. Koh
*Attorney, Agent, or Firm*—Oblon, Spivak, McClelland, Maier & Neustadt, P.C.

[57] ABSTRACT

A feed additive for ruminants, comprising dried glutamic acid fermentation solubles, dried corn fermentation solubles, or a mixture of dried glutamic acid fermentation solubles and dried corn fermentation solubles, wherein the dried solubles have been dried to a total moisture content of less than 30% by weight at a temperature not less than about 80° F. and not more than about 900° F.

13 Claims, No Drawings

FEED ADDITIVE FOR RUMINANT ANIMALS AND A METHOD FOR FEEDING A RUMINANT

SUMMARY OF THE INVENTION

The invention relates to a feed additive for ruminant animals. When used as a component in a diet formulated for this class of animal, the invention additive will enhance feed intake, increase rumenal digestive efficiency, and aid dietary ionic balance. In a preferred embodiment of the invention two common byproduct materials, glutamic acid fermentation solubles and corn fermentation solubles are mixed and then dried at a temperatures that does not denature the organic nitrogen components present therein. This temperature varies with the drying method used and generally ranges from not less than about 80 to not more than about 900 degrees Fahrenheit.

In this invention, either of the glutamic acid fermentation or corn fermentation solubles, when dried as indicated above, can be used independently, but maximum response is elicited when both are present. To facilitate drying, the liquid solubles (either as a mixture of the two or independently), may be blended onto a carrier such as wheat middlings. In addition, one or a combination of proteolytic, amyalytic and cellulytic enzymes of either bacterial or fungal origin as well as amino acids such as glutamic acid can be added either prior to or after drying to further enhance ruminant response. Thus, the invention relates to the dietary supplementation of ruminant animals with a combination of amino acids, peptides, and non-protein nitrogen supplied by either combining and drying glutamic acid fermentation solubles and corn fermentation solubles optionally with a carrier such as wheat middlings if needed, or either of these fermentation solubles alone optionally combined with said carrier. The drying of these materials is preferably accomplished at temperatures less than 900 degrees Fahrenheit. Enzymes of fungal or bacterial origin as well as amino acids can be added to enhance biological effect.

BACKGROUND OF THE INVENTION

The normal diet of the ruminant animal is forage. Forage includes grasses, legumes and cellulytic byproducts of agricultural production. These are either fed fresh as pasture or green chop; in a dry form as hay; or in a preserved state as silage. The ability to utilize these materials as sources of nutrients is only possible as a result of pregastric bacterial fermentation in the rumen, the nonfundic portion of the animal's stomach. Here, bacterial action reduces the complex structural carbohydrates; cellulose, hemicellulose, and lignin and the associated nonstructural carbohydrates; pectin, starches and sugars, to either fatty acids or more chemically simplistic carbohydrate forms, which are then subjected to gastric action in the fundic stomach and small intestine.

The adaptation of ruminants to pregastric digestion has involved a system of retention of digesta, which is an essential part of the mechanism for maximal extraction of energy. This retention requires some sacrifices in food intake, which becomes more limited on forage based diets because the coarser ingesta must be retained longer to achieve efficient extraction of energy. This poses a special problem in the modern, domesticated ruminant, in that the nutrient demands created by genetic selection for rapid lean muscle growth or high levels of milk production far exceed the supply generated by rumenal fermentation of forage based diets. The diets that must be fed require the addition of large amounts of nonstructural carbohydrate (starches and sugars) fed in the form of grain which, unfortunately, often is a source of physiologic and metabolic stress. These problems are associated with the changes which occur in rumenal fermentation as a result of grain ingestion. As a consequence, feeding strategies must attempt to maximize forage use while not compromising nutrient supply needed for maintenance and production.

A solution to the problem of nutrient supply and demand in the ruminant animal, as imposed by the limitations of bacterial, pregastric digestion, is to enhance the efficiency and rate at which this process occurs. The rumen is a continuous fermentation system that is provided with nutrients (feeds), buffers (salivary and other salts) and fluids (water and saliva) on both a continuous and an intermittent basis. The efficiency of this fermentation is measured through rumen turnover. Turnover is conventionally expressed as the portion of the rumen contents that leaves the rumen per hour. Liquids and solids turn over at different, but usually related, rates. Liquid flow rates, as proportions of the total liquid volume, have been found to turn over at rates that increased from <8 to 13.5%/hr as dry matter intake went from 5 to 21 kg/day (*Livestock Prod. Sci.*, 17:37, 1987). At the same time, solids turnover increased from 3 to 5%/hr due to increased intake. In other studies, values of 17%/hr for liquids (*Can. J. Ani. Sci.*, 64 (Supp.):80, 1984) and as high as 7.0%/hr for concentrates (*J. Dairy Sci.*, 65:1445, 1982) were reported. In a typical ration of a dairy cow consuming >20 kg dry matter/day, representative rumen digesta passage rates would be 15%/hr for liquids, 6%/hr for grains and 4.5%/hr for forages. The rates would all decrease with a lower level of intake.

Another important rumen characteristic associated with turnover rate is microbial yield, where microbial yield is defined as the quantity of microbial mass flowing from the rumen per day. A further, and important refinement of this expression of microbial yield, which is also effected by turnover rate, is the efficiency of microbial yield. This is usually expressed as grams of microbial protein (or nitrogen) produced per kg of organic matter(OM) digested in the rumen. Both aspects of microbial production have applied significance. Microbial yield is important as an index of the amount of microbial protein available to the ruminant animal per day. Microbial efficiency is important as part of the calculation of microbial yield where: microbial yield (gr of microbial N/day)=microbial efficiency (gr microbial N/kg digested organic matter)×kg OM digested in the rumen per day.

Because of the rapid rumen turnover rates commonly found in cattle with high dry matter intakes, such as dairy cattle, high microbial efficiencies are expected. If, however, an imbalance in the nutrients available to the rumen microbes occurs, the microbial efficiency can be impaired. This is particularly evident if ruminally available nitrogen or carbohydrate sources are inadequate.

Rumen microbes, with a few exceptions, use only carbohydrates (CHO) for energy, and growth will be proportional to the amount of carbohydrate fermented. This relationship is expressed by the equation:

$$\text{Gr of microbial protein/day} = \text{kg total CHO digested/day} \times \frac{\text{gr microbial protein/kg CHO digested}}{\text{in the rumen}}$$

In this equation, carbohydrate digested includes the fermentable portion of the fibre, plus sugars and starches. In practice, the analytical techniques used to determine carbohydrates do not clearly delineate the contribution made to the various sources in a forage-grain ration. Commonly, neutral detergent fiber (NDF) is used to quantitate the total structural or cell wall carbohydrates, which include cellulose, hemicellulose and lignin. Sugars and starches are not individually determined, but are included, along with pectins, gums and other components, in a fraction referred to as non-structural carbohydrate (NSC). As the digestibility of NSC in the rumen is considerably higher than that of NDF, it follows that the amount of total carbohydrate digested per day is positively related to the proportion of NSC in the diet. The primary source of NSC in the diet of dairy cows is grain. However, as previously indicated, it is both nutritionally and physiologically desirable to obtain a greater portion of the ruminally available carbohydrate from the forage portion of the diet, so that the risk associated with feeding high levels of grain to the animal is reduced.

Although energy, i.e., carbohydrates, is usually considered to be the most limiting nutrient for maximum microbial growth, in normal diets currently fed to domestic ruminants, ruminally available nitrogen, derived from the protein component of the ration, is often more limiting than available energy. Experiments (*J. Dairy Sci.*, 65:1445, 1982) have shown that while increasing ruminally degradable nitrogen had a small effect on carbohydrate digestion, it had a marked effect on microbial efficiency. Ruminal bacteria will effectively utilize several sources of degradable nitrogen. Most species can and will use ammonia for growth. However, all species prefer amino acids or peptides, with larger peptides being taken up in preference to small peptides and amino acids. Studies in vivo and in vitro, both using labeled nitrogen, support this concept. However, maximal microbial efficiency is best supported by providing adequate amounts of nitrogen in forms that synchronize with the degradation of ruminally available carbohydrates. In terms of the nitrogen input, this is most easily achieved by combining nonprotein nitrogen, peptides and amino acids with varying solubilities, thus achieving the equivalent of a nitrogen steady state within the rumen. Conventional feed stuffs however, have not been shown to provide any of these elements in sufficient balance to achieve steady state. Release rates of peptides and amino acids from feedstuffs for example, are dictated by microbial degradation of intact protein. Rather than be stimulatory to microbial growth and efficiency, their availability is a function of it. The usual sources of nonprotein nitrogen are inorganic materials such ammonium salts or urea. These materials are so soluble that they volatilize rapidly within the rumen almost upon ingestion and a large portion of their nitrogen is lost as ammonia before rumenal bacteria can effectively utilize it. They are also unpalatable and toxic. Thus, the formulating of ruminant diets with the objective of achieving a nitrogen steady state in the rumen has remained elusive.

During certain phases of the production cycle of domestic ruminants, nutrient intake can be compromised by a number of physiologic factors. For example, in the period immediately preceding parturition, changes in hormonal balance associated with that event can negatively effect gastrointestinal motility, such that feed intake is reduced. The resulting reduction in nutrient availability to the animal has been associated with a number of metabolic disorders which are common to domestic ruminants during this period. An example is the metabolic disease, "milk fever" caused by a state of systemic hypocalcemia which results from parturient inappetence. One avenue of research that has been proven to offer some relief from this problem is the dietary manipulation of ionic balance in the prepartum ration. Diets normally fed ruminant animals are highly cationic in content. This is reflected in blood pHs that tend to be basic and in the animal's highly basic urine pH, usually in the range of pH 8 or higher. By shifting the dietary balance of cations and anions in favor of anions for a period of time prepartum, a metabolic acidotic state can be achieved, and blood pH is reduced. Urine pH, the most easily measured response to a shift to an anionic diet is reduced and the degree of acidity is a function of the success of this shift. It is widely recognized by practitioners in the art that efficacy of dietary ionic shift is reflected in urinary pH reduction. Values below pH 8.0 are acceptable but it is preferred that urine pH values fall below neutrality or pH 7.0. To accomplish this, it is recommended that diets have a cation/anion balance that is as negative as is possible, usually below (−)60 meq/kg. This shift in homeostasis has been shown to increase feed intake, and improve nutrient homeostasis, thereby reducing the incidence of the resulting, associated metabolic and physiologic disorders such as milk fever.

Currently dietary ionic shift has been attempted through the supplementation of combinations of anionic salts. Examples include ammonium chloride, ammonium sulfate, calcium chloride and calcium sulfate. However, anionic salts as a group are highly unpalatable to ruminant animals and potentially toxic due to their extreme solubility of the nitrogen component. Dry matter intakes where anionic salts have been fed are routinely reduced to a point where nutrient balance as a whole is compromised. Consequently, although the concept is widely accepted as physiologically efficacious, its practice is limited by a lack of an appropriate vehicle to achieve shift. This vehicle should be palatable, safe and metabolically effective, as indicated by blood or urine pH reduction.

Finally, another method of enhancing feed intake is to formulate diets that ensure that rumenal microbial fermentation is occurring efficiently. This is most easily achieved through synchronizing the availability of ruminally degradable nitrogen with ruminally available carbohydrate.

OBJECTS OF THE INVENTION

In view of the deficiencies in the art as described above and other related goals well known in the art, one object of the present invention is to provide a novel source of ruminally degradable nitrogen sources in the forms of modified nonprotein nitrogen, peptides and amino acids which, when fed to ruminant animals, maximize microbial growth and efficiency and increase feed intake.

Another object of the present invention is to provide a feed additive which allows for the successful dietary manipulation of intake cation/anion ratios, so as to allow for a shift in metabolic ionic homeostasis.

Another object of the present invention is to provide a feed additive which allows for the synchronization of ruminally degradable nitrogen and carbohydrate sources so as to maximize ruminal microbial efficiencies and yields.

DETAILED DESCRIPTION OF THE INVENTION

The above objects have been obtained by the discovery of a composition comprised of dried free amino acids, peptides, organic and inorganic nitrogen as well as structural (fibre) and nonstructural carbohydrates as needed. In the preferred embodiment of the invention, this composition is obtained from either glutamic acid fermentation solubles, corn fermentation solubles or a mixture thereof, although any source material that provides the components of these fermentation solubles may be used. Common sources are fermentation byproducts derived from a fermentation of fungal or bacterial origin. Examples include corn steep liquor, corn distiller's solubles, and rye distiller's solubles. The origin of the base materials is not important. That they provide the components of corn and/or glutamic acid fermentation solubles is. A carrier such as wheat middlings, etc. can be included if desired and in view of the drying method used. Any amount of carrier can be used. Typical ranges (wt/wt) of dried solubles to wheat middlings are from 10 to 1 to 1 to 10 including all values and subranges therebetween. The carrier is preferably edible by the ruminant and is preferably a common feed ingredient. Either of these solubles alone or individually, blended onto a carrier if necessary, are suitable. When the corn and glutamic acid fermentation solubles are mixed, they are mixed in any proportion, either before or after drying and each optionally on a carrier if mixed dry.

The one or more solubles is then dried to a maximum moisture content of about 30% at low temperature. Moisture contents of 0%, 8%, 14%, etc. are acceptable. Drying methods which may be used include vacuum drying, direct and indirect heat application, spray drying, evaporation, etc. A forced air grain processor otherwise useful to roast soybeans is preferred. Regardless of the method used, drying must be done at temperatures which will allow for modification of the solubility of the nitrogen fractions without denaturing them. To the at least one of corn or glutamic acid fermentation solubles, one or a combination of cellulytic and/or amyalytic enzymes of either bacterial or fungal origin and an amino acid such as glutaminic acid may also be added to enhance biological effect. Glutamine can be used as a substitute for, or along with, glutamic acid. These materials may be added either before or after drying. Generally these components total from about 4 to about 10% by weight of the final composition. Preferred amounts of enzyme range from 15–60 gms (2 to 4 wt.%) of xylanase (75,000 xylanase units per gram) and 20 to 84 mls (2 to 4 wt.%) of cellulase (100,000 endocellulose units per ml) based on total weight of additive. Preferred amounts of glutamic acid range from 0.70 to 4.0 grams per head per day (0.07 to 0.02% by wt. of additive).

The present inventor has provided a blended source of organic and inorganic nitrogen of variable solubilities in the form of nonprotein nitrogen, peptides, amino acids and intact protein derived in the preferred embodiment of the invention from glutamic acid fermentation solubles and/or corn fermentation solubles to which a carrier, additional amino acids and enzymes can be added and which is superior to prior art compositions.

Glutamic acid fermentation solubles and corn fermentation solubles are the liquid effluents having greater than 30 wt.% water (moisture), typically 50–60%) from the bacterial fermentative process used to produce monosodium glutamate and lysine hydrochloride, respectively. These processes are well known and common manufacturing process, and the nomenclature by which these products are defined has been determined by the Association of American Feed Control Officials. Glutamic Acid Fermentation Solubles is comprised of a combination of water, nonprotein nitrogen, primarily in the form of ammonium chloride, peptides and free amino acids derived from the hydrolysis of the microorganisms used to produce the fermentation, glutamic acid and inorganic salts such as $MgSO_4$, NaCl and $KH_2PO_4$. Corn Fermentation Solubles is comprised of a combination of water, nonprotein nitrogen, primarily in the form of ammonium sulfate, peptides and free amino acids derived from the hydrolysis of the microorganisms used to produce the fermentation and inorganic salts such as $MgSO_4$, NaCl, and $MnSO_4$.

Any enzyme capable of reducing plant tissue such as proteins, starches, sugars, pectins, cellulose, hemicellulose, and lignin, are suitable for use in this invention. Examples of such enzymes are proteases, amylases, dextranases, pectinases, cellulases, xylanases, mannanases and ligninases. These can be either of bacterial or fungal origin. Mixtures may be used.

Any amino acid may be added to the invention mixture described above, although glutamic acid is used in the preferred embodiment of this invention.

The invention is useful as a feed additive in any ruminant diet.

As a result of processing (i.e. drying to a moisture content of up to about 30% by weight, optionally on a carrier), the nonprotein nitrogen fractions of the invention composition, normally highly soluble in the rumen environment, are reduced in their solubility so as so provide rumen bacteria with a sustained release source of ammonia nitrogen. The nonprotein nitrogen components are further complemented by the peptides and intact protein the invention composition provides, the net result being a feed additive which provides a nitrogen steady state which significantly enhances rumen microbial efficiency and microbial yield. This effect can be further enhanced by the addition of an amino acid like glutamic acid which, when added to the invention composition, will supply the animal with the amino acid such as glutamic acid at a rate not less than 0.08 grams/kg of dry matter intake per day. The addition of one or more of proteolytic, amyalytic and cellulytic enzymes also enhances the net response by allowing for the synchronization of the nitrogen sources with carbohydrates, thus ensuring the availability of sufficient quantities of energy for the increased microbial protein synthesis that is stimulated by the modified nitrogen fractions.

The invention feed supplement may be added to any feed fed to ruminants, preferably to feeds comprising at least one of grass, legume, corn or small grain silage or hay, grain byproducts, oilseeds and oilseed meals, corn grain, and small grains etc., to provide a supplemented feed. The amount added will generally range from about 0.5 to about 12 lbs. per head per day, depending upon application and species to be fed.

Having generally described this invention, a further understanding can be obtained by reference to certain specific examples which are provided herein for purposes of illustration only and are not intended to be limiting.

EXAMPLES

Preparation of the Ruminant Feed Supplement

In this example, the drying method used is forced air, although any process which allows for the removal of excess moisture while not damaging the biological value of the nitrogen components of the invention can be used, with the necessary modifications in materials preparation as dictated by the method used.

A mixture of Glutamic Acid Fermentation Solubles and Corn Fermentation Solubles at a ratio of 60/40 on a weight, weight basis is blended onto a wheat middlings carrier on a 1.67 to 1 weight, weight ratio of solubles to wheat middlings. These ratios can vary with the intended end product, or either of the components that make up the liquid blend can be used alone. The carrier may also be omitted if not desired or required by the drying process used. The material is then exposed to forced air at temperatures not less than about 80 degrees but not more than about 900 degrees Fahrenheit, with a preferred range being between about 190 and about 280 degrees Fahrenheit for a period not less than about three minutes. This material is then cooled to about 90° F. and then about ⅓ of this material is recycled and reblended and again exposed to forced air at temperatures not less than about 80 degrees but not more than about 900 degrees Fahrenheit. If desired, enzymes as described above, and amino acids like glutamic acid may be added at any time during the processing (drying stage). The material has a final moisture content of about 15% by weight based on total weight. This material can then be fed directly to a ruminant animal as part of its formulated ration, with use rate dictated by species and intended dietary application.

The Effect of the Ruminant Feed Additive on Ruminal Nitrogen Utilization as Measured by Microbial Efficiency and Yield A series of invitro and invivo experiments were conducted to determine the efficacy of the invention feed additive on enhancing microbial efficiency and growth.

A series of invitro experiments, using the continuous fermentation technique of Hoover et. al. (*J. Ani. Sci.*, 43:528, 1976) compared Glutamic Acid Fermentation Solubles, processed using the forced air method of example 1, to liquid, nonprocessed glutamic acid fermentation solubles and to a liquid urea and molasses blend as a source of ruminal microbial dietary nitrogen. All the diets contained approximately 19% crude protein, of which 10–11% was provided by the basal mixture and 8–9% (45% of the total nitrogen) was provided by the additive sources. The diets are presented in Table 1. Responses to the treatments are summarized in Table 2. The processed glutamic acid fermentation solubles when compared to nonprocessed material significantly improved the digestibility of dietary crude protein and significantly increased total production of volatile fatty acids. It also modified ruminal bacterial species populations from predominately cellulytic to amylolytic species. This is evidenced by increases in the nitrogen content of the bacteria produced, and an increase in the conversion of ingested carbohydrate and feed nitrogen to microbial protein in the feed additive based fermentations. These changes are recognized in the art as the biochemical signatures of these species. The feed additive also significantly increased total grams of microbial protein produced per day.

In summary, in a series of invitro experiments using a continuous fermentation technique, processed glutamic acid fermentation soluble was found to be vastly superior to nonprocessed material as a source of available ruminal nitrogen, and, in fact, actually not only increased net conversion of nutrients to microbial protein, but also modified bacterial populations to favor more efficient carbohydrate fermenting bacteria as well. In the nonprocessed form, glutamic acid fermentation solubles was found to be inferior even to the urea/molasses blend in all the parameters measured, while in the processed form, the material was significantly superior to urea/molasses in all comparisons except in total daily volatile fatty acid production.

A series of invivo studies were conducted in which the mixture of glutamic acid fermentation solubles and corn fermentation solubles blended on a wheat middling carrier described above processed to 85% dryness using the forced air method, was fed to lactating dairy cows, as a dietary substitute for soybean meal. The objective of the study was to determine the biological value of the invention feed additive by comparing it to a recognized feed ingredient, soybean meal, normally used in ruminant rations as a primary source of ruminally degradable nitrogen for ruminal microbial growth. In this series of studies, four diets were formulated in which the feed additive was substituted for soybean meal at varying levels; 100% substitution, 65% substitution and 35% substitution on a dry matter, weight/weight basis. A diet in which no feed additive was added served as a control. All diets were isonitrogenous but varied in their solubility and undegraded intake protein (UIP) content due to the presence of the invention additive. As compared to the control ration the protein in all feed additive based diets was analytically higher in protein solubility, with as much as 50% of the dietary crude protein being measured as being soluble in all the feed additive diets. This high solubility is approximately twice the level recommended by practitioners of the art.

These formulations and their analysis demonstrate a key benefit of the present invention: it is well recognized by practitioners in the art that nonprotein nitrogen that is derived from the components of invention additive is naturally highly soluble, in the range of 98%. It is further recognized that the disassociation of these nonprotein nitrogen sources occurs rapidly after introduction into the rumen environment. As normal chemical analysis of feed ingredients are unable to distinguish modifications in rates of solubility, the analysis of the feed additive based diets reflect a solubility value that would be obtained with nonprocessed materials. Chemically, modification in nitrogen solubility which occurs in the feed additive as a result of processing can be measured by measuring free chlorine. This analysis indicated that only 33% of the nonprotein nitrogen components in the invention were readily soluble. In this experiment however, the higher solubility value was used in order to demonstrate efficacy of the invention.

A second line of evidence which proves the modification of nonprotein nitrogen solubility in the invention is the lack of change in blood urea nitrogen levels which is presented below. Treatment rations were also all deficient in undegraded intake protein (UIP), with the magnitude of the deficiency increasing as the feed additive made up a larger percentage of the diet. The diets also varied somewhat in calorie content, with the lower energy again being associated with the greater inclusion of the invention additive. These diets are summarized in Table 3. Diets were fed for 21 day periods in a balanced complete block design. Data was analyzed using SAS (SAS User's Guide: Statistics Version 5 Edition 1985. SAS Inst., Inc., Cary, N.C.) The results of the this study are summarized in Table 4.

In spite of the differences in caloric content, protein solubility and UIP components, no significant differences in milk volume, milk true protein, and milk solids nonfat were noted across treatments. Differences were noted in milk fat percent and milk crude protein in favor of addition of soybean meal back into the ration. Of particular importance was the observation that in spite of the significantly greater ration solubility in feed additive based diets as measured by wet chemistry, blood urea nitrogen (BUN) and milk true protein were not effected when compared across treatments. While high ration protein solubility is documented in the literature as causing elevated blood urea nitrogen levels no changes were noted in this parameter across treatments regardless of the analytically based expressed increase in protein solubility as the feed additive made up a greater percentage of the total diet. Milk true protein values were also not effected. This is indicative of the fact that in spite of the shortage of UIP, and the measured high protein solubility in feed additive based rations, the amount of amino acids delivered to the mammary gland for milk protein synthesis was not effected. These amino acids in the case of the feed additive based rations are coming probably from microbial protein, not UIP as in the control.

One conclusion of this experiment is that the invention feed additive is superior to soybean meal as source of ruminally degradable nitrogen when used in rations formulated for high production in dairy cows and that this superiority is the result of a net increase in microbial efficiency and yield. These data verify the invitro data previously reported and confirm the biological importance of this invention on ruminal microbial efficiency.

The Effect of the Invention Ruminant Feed Additive on Synchronization of Ruminally Degradable Nitrogen and Carbohydrate as Measured by Microbial Efficiencies and Yields A series of invitro experiments were conducted using the continuous fermentation technique of Hoover et al, supra to determine the effects of enzyme addition to microbial efficiency and growth when used in conjunction with the mixture of processed glutamic acid fermentation solubles and corn fermentation solubles on a wheat middling carrier described above and dried using the forced air method at temperatures of 190° to 280° F. to 15% moisture based on total weight. To this mixture a blend of cellulytic enzymes comprised of 4 wt. % xylanase (70,000 xylanase units per gram) and 4 wt. % cellulase (100,000 endocellulose units per gram) was added. A ration was then formulated to maximize forage use and its formulation is summarized in Table 5. This ration was fed in both treatment and control, with the treatment being the addition of the enzyme cocktail to the processed blend of materials described above. The feed additive was fed at a constant amount across both treatment and control. The results of this study are summarized in Table 6. As shown, addition of the enzyme cocktail significantly improved fibre digestibility, crude protein digestibility, and production of grams of microbial nitrogen produced per day although the base feed additive of the invention provided good results in its own right. Microbial efficiencies as measured by dry matter, organic matter, and carbohydrate conversion to microbial nitrogen, expressed as kg of microbial nitrogen produced per kilogram of nutrient digested, all were significantly enhanced by the addition of the enzymes. Total volitile fatty acid VFA production, which in previous experiments with the feed additive was not enhanced was also significantly increased. All of these data indicate that through synchronization of carbohydrate and ruminal nitrogen availability, microbial efficiency and yield can be enhanced, and that the components of the invention facilitate this occurrence.

Effect of the Invention Ruminant Feed Additive on Dietary Manipulation of Intake Cation/Anion Ratios A series of experiments were conducted to test the effectiveness of the invention feed additive in manipulation of dietary cation/anion ratios. The feed additive used was dried glutamic acid fermentation solubles which was fed at a rate of 1.49 lbs. per head per day. Nine pregnant Holstein heifers were assigned to one of three dietary treatments in a 3×3 factorial experiment, with each period being less than 21 days. All diets were based upon a combination of barley and barley silage and were isocaloric and isonitrogenous, the only difference being the source of nitrogen. The control ration was urea based and provided a highly positive cation/anion balance of (+) 200 meq/kg of dry matter. Treatment 1 used the anionic salt, ammonium chloride. Treatment 2 used the feed additive. Both treatments were formulated to provide a cation/anion balance of (−) 100 meq/kg of dry matter. The results of this experiment are summarized in Table 7.

Feed Additive diets resulted in animals consuming 350 grs more of dry matter than either the control or ammonium chloride rations. Dry matter digestibility was also higher for the invention feed additive rations as well. Both the ammonium chloride diet and the feed additive ration resulted in blood pH shifts and lower blood pHs than the control. Both treatments increased urine volume, and lowered urine pH. Although both treatments increased urinary excretion of sodium and calcium, urinary excretion of magnesium, phosphorus and calcium was significantly less than in the ammonium chloride diets. One conclusion is that the invention feed additive not only is effective in dietary cation/anion manipulation, but is physiologically superior to ammonium chloride as measured by its positive effect on feed intake, diet digestibility, and retention of absorbed and resorbed calcium, phosphorus and magnesium.

In another series of experiments, a group of multiparous, dry Brown Swiss cows were fed the invention feed additive for a period of 15 days prior to parturition. The feed additive used was a blend of glutamic acid fermentation solubles and corn fermentation solubles in a 60/40 wt/wt ratio and fed at a rate of 2.2 lbs. per head per day on a dry mater basis and was substituted for a commercial product prepared by Dawes Laboratories, Ft. Dodge, Iowa, which is commonly used to manipulate cation/anion balance and which consisted of a combination of magnesium sulfate, calcium chloride and calcium sulfate. Dietary cation/anion balance of this diet was determined to be (−) 81 meq/kg of dry matter. Substitution of the feed additive resulted in an increase in ration cation/anion balance to (−) 21. Urine pH was used as criteria to measure response. Urine pH base line was determined while the animals were consuming the commercial product. It was then reanalyzed after the animals were on the feed additive for 15 days and again reanalyzed in 15 days after they had been switched back to the commercial product. Base urine pH on the commercial product averaged pH 8.1 for the group. After 15 days on the feed additive, urine pH had dropped to 6.7. When the feed additive was removed and the commercial preparation restored, urine pH returned to the base line of 8.1. Dry matter intakes also increased by 10% when the feed additive was substituted. One conclusion from this trial was that the invention feed additive, although providing a much less negative cation/anion balance than what has been traditionally recommended and much less negative than that achieved using a widely used commercial preparation of anionic salts, resulted in a physiologically significant shift in cation/anion balance as measured by urine pH reduction. Dry matter intake was also reported to increase by 10%, which is extremely important in maintaining nutrient homeostasis in pre and post parturient ruminant. Also, ruminants fed the feed additive prior to parturition experience a significant reduction in mammary gland edema, an important and economically serious problem observed in lactating ruminants.

As discussed in the background of the invention, the dietary addition of nitrogen sources of varying solubilities, that can be used alone or in synchrony with carbohydrate sources in ruminant rations, has been hypothesized to enhance ruminal microbial efficiencies and microbial yields. Diets formulated with high inclusion of forages are also known to be physiologically beneficial in ruminant animals, by reducing the likelihood of metabolic and physiologic problems associated with feeding diets high in grain. Furthermore, the ability to cause shifts in the normal diet of the ruminant from a positive to a negative balance between dietary cation and anion intake has also been shown to positively effect metabolic function in the ruminant. All of these factors when properly implemented result in a range of positive responses within the animal. However, the use of natural feed stuffs alone, or in conjunction with available sources of nonprotein nitrogen, have not been shown to effectively and safely provide nitrogen in the forms and at the rates desirable to maximize response. High productivity as measured by muscle growth or milk production in domestic ruminants forces the use of high inclusion rates of grains in order to meet nutrient demand. Although maximum forage inclusion in rations fed to these animals is known to be essential to maintaining the animal's overall well-being, their use depends upon microbial degradation in the pregastric stomach. Although it has been theorized that microbial growth and efficiency, factors directly related to forage digestibility, can be enhanced by providing rumen microbes with nitrogen and carbohydrate that provides a nutrient steady state within the rumen, implementation has not been possible due to inadequacies inherent in natural feedstuffs and nonprotein nitrogen sources. The use of anionic salts to achieve cation/anion shift, although recognized as metabolically advantageous, has not been widely implemented due to their highly unpalatable nature and their associated toxicity due to their extreme solubility in the rumen environment.

However, the inventor herein has discovered that by low temperature drying of two materials commonly used as is in the formulation of liquid ruminant feeds, were said materials contain a source of nonprotein nitrogen, peptides and amino acids, he has been able to drastically modify the solubility of these components to a point were nitrogen sustained release is achieved and nonprotein nitrogen, an essential component of achieving steady state, can be safely fed to the ruminant. This is evidenced by the increased microbial yields and efficiencies observed in the invitro experiments above especially when the invention was compared to its components in the unprocessed form. It is also evidenced in the invivo experiments by the lack of change in blood urea nitrogen when the invention was fed as a replacement for soybean meal. Blood urea nitrogen is an indicator recognized by practitioners in the art as highly sensitive to dietary protein solubility. It is further evidenced by the fact that in spite of the rations in which the invention was used being lower in energy, significantly lower in undegradable protein and higher protein solubility than the positive control ration, formulated to specifications that are recommended by practitioners of the art, animal performance was not effected. By addition of enzymes which disrupt plant tissues, the effects of the processed components are enhanced. What is more, the forage component of the diet can be increased without compromising diet efficacy. This is supported by the effects enzyme addition had on microbial efficiency and yield, factors already demonstrated to be integral to maximal forage use and ration digestibility.

As a aid in manipulation of dietary cation/anion ratios, the invention has been demonstrated to be superior to existing technologies, such as ammonium chloride or other commonly used sources of anionic salts, as measured by reductions in blood and urine pH, increased retention of absorbed and reabsorbed calcium, phosphorus and magnesium, and increased dry matter intake. Conventional sources of anionic salts have actually been shown to have variable efficacy in terms of blood and urine pH reduction, actually routinely depress feed intake, and increase urinary excretion of calcium, phosphorus and magnesium.

TABLE 1

Analysis of Diets Used in the Invitro Comparison of the Feed Additive to Glutamic Acid Fermentation Solubles (GAFS) and a Urea/Molasses Blend (% Dry Matter Basis)

| Diet | Urea/Mol. | GAFS | Feed Additive |
|---|---|---|---|
| Component | | | |
| Crude Protein | 18.8 | 18.8 | 19.0 |
| Nonstructural Carbohydrate | 32.5 | 32.5 | 33.5 |
| Acid Detergent Fiber | 18.0 | 18.0 | 18.2 |
| Neutral Detergent Fibre | 34.6 | 34.6 | 34.2 |
| Fat | 1.26 | 1.26 | 1.41 |

TABLE 2

A Comparison of the Feed Additive, Glutamic Acid Fermentation Solubles and a Urea/Molasses Blend on Microbial Growth and Efficiency. (Main Effects)

| Diet | Urea/Molasses | GAFS | Feed Additive |
|---|---|---|---|
| Component | | | |
| Crude Protein (% Digestible) | 68.41 | 63.05 | 72.93 |
| Total Volatile Fatty Acids: mM/day | 341.89 | 317.17 | 336.68 |
| Bacteria (% Nitrogen) grams Microbial N./kg digested) | 8.44 | 8.86 | 9.52 |
| Organic Matter | 26.81 | 26.33 | 32.48 |
| Carbohydrate | 28.46 | 28.56 | 39.71 |
| Conversion of Feed Nitrogen to Microbial Nitrogen | 0.83 | 0.82 | 0.87 |

TABLE 3

Analysis of Diets Used in the Invivo Comparison of the Feed Additive and Soybean Meal as a Source of Ruminally Available Nitrogen for Microbial Growth.

| Diet | Unit | All Soy | All Feed Additive | 65% Soy | 35% Soy |
|---|---|---|---|---|---|
| Component | | | | | |
| Dry Matter | % | 62.2 | 72.9 | 63.36 | 63.5 |
| Net Energy L | Mcal/lb | 0.77 | 0.74 | 0.76 | 0.75 |
| TDN | % DM | 73.31 | 68.19 | 70.8 | 69.6 |
| Crude Prot. | % DM | 18.6 | 18.3 | 18.4 | 18.3 |
| Soluble Prot. | % CP | 28.4 | 49.2 | 36.6 | 42.95 |
| UIP | % CP | 33.2 | 27.0 | 30.6 | 28.7 |

TABLE 4

A Comparison of Production Parameters in Dairy Cows Fed Diets Based Upon the Feed Additive; Soybean Meal and; Combinations of Soybean Meal and the Feed Additive.

| Diet | DMI (Kg/day) | Milk Vol. (kg/day) | Milk Fat (%) | Milk C. Prot. (%) | Milk T. Prot (%) | BUN Mg/DL) |
|---|---|---|---|---|---|---|
| Feed Add. | 20.3 | 35.5 | 3.09 | 3.01 | 2.9 | 18.4 |
| All Soy | 20.4 | 35.3 | 3.4 | 3.2 | 2.9 | 18.6 |
| 35% Soy | 19.9 | 34.3 | 3.4 | 3.07 | 2.82 | 19.7 |
| 65% Soy | 20.4 | 35.8 | 3.4 | 3.17 | 2.9 | 18.2 |

TABLE 5

Analysis of the Diet Used in the Invitro Comparison of the Feed Additive and the Feed Additive Plus Enzymes

| Component | Unit | Amount |
|---|---|---|
| Dry Matter | % | 50.7 |
| Net Energy Lac. | Mcal/lb | 0.70 |
| TDN | % DM | 67.2 |
| Crude Prot. | % DM | 17.7 |
| Soluble Prot. | % CP | 43.63 |
| UIP | % CP | 29.5 | a) Forage/Concentrate Ratio: 57.6/42.4
b) DM Forage % of BW: 2.23

TABLE 6

A Comparison of Microbial Growth and Efficiencies of Diets based Upon the Feed Additive and the Feed Additive Plus Enzymes.

| Diet | Feed Additive | Feed Additive plus Enzymes |
|---|---|---|
| Component | | |
| Crude Protein (% Digestible) | 61.8 | 65.7 |
| ADF | 31.6 | 35.8 |
| NDF | 36.1 | 40.1 |
| Total Volatile Fatty Acids: mM/day | 429.46 | 468.86 |
| Kgs Microbial N./Kg Digested; | | |
| Dry Matter | 23.3 | 25.7 |
| Organic Matter | 29.7 | 32.0 |
| Carbohydrate | 39.5 | 42.0 |

TABLE 7

A Comparison of the Feed Additive, and Ammonium Chloride in Dietary Cation/Anion Manipulation.

| Diet | Unit | Control | Ammonium Chloride | Feed Additive |
|---|---|---|---|---|
| Component | | | | |
| Dry Matter Intake | kg/day | 9.28 | 9.07 | 9.42 |
| Dry Matter Dig. | % | 56.3 | 57.4 | 58.4 |
| Blood pH | | 7.65 | 7.61 | 7.61 |
| Urine pH | | 8.44 | 6.09 | 5.96 |
| Urine Vol. | L. | 9.9 | 12.3 | 14.3 |
| Urine Na. | mg % | 69.9 | 79.8 | 129.1 |
| Urine K. | mg % | 298 | 225 | 212.0 |
| Urine Mg. | mg % | 26.7 | 21.9 | 15.2 |
| Urine Ca. | mg % | 4.3 | 12.5 | 8.4 |
| Urine P | mg % | 19.8 | 73.5 | 3.7 |

The present invention feed additive increases the feed intake of ruminants fed therewith. By this is meant that when the invention feed additive is fed to a ruminant in an amount of approximately 2 lbs. per head per day where the additive is about 62% solubles of about 15% moisture feed intake increases by from about 4% to about 10%. 4% has been observed in dairy heffers and 10% has been observed in Brown Swiss Cows. In dairy heffers the invention feed additive was compared to a control diet and one made with ammonium chloride. In the Brown Swiss Cows the feed additive was substituted for a commercial preparation of anionic salts in a prepartum diet.

The present invention feed additive also increases ruminal digestive efficiency. By this is meant that the invention additive in its base form, that is, without the addition of any enzymes, additive increases crude protein digestibility in the ruminant by from 5–16%, increases by from 5–21% the amount of microbial nitrogen produced per kilogram of organic matter digested and increases the amount of microbial nitrogen produced per kilogram of carbohydrate digested by about 5–40%. The increase in the conversion of feed nitrogen to microbial nitrogen is approximately 5% for the invention feed additive.

Further, the invention feed additive increases protein digestibility by from about 3–6%. By this it is meant that, as measured by grams of microbial nitrogen produced per kilogram of nutrient digested, the present invention feed additive produces the following increases: organic matter, 8%; carbohydrate, 6% increase; total volatile fatty acid production, 9% increase. Both the ruminal digestive efficiency and protein digestibility results were measured when the invention feed additive made up from 8–9% of the total feed mixture or about 8 pounds of additive with 62% solubles of 15% moisture or 45% of the total dietary nitrogen and was compared to an isocaloric, isonitrogenous urea/molasses control diet and a diet in which unprocessed glutamic acid fermentation solubles at similar inclusion rates was present.

What is claimed as new and is desired to be secured by letters patent of the United States is:

1. A feed additive for ruminants, comprising dried glutamic acid fermentation solubles, dried corn fermentation solubles, or a mixture of dried glutamic acid fermentation solubles and dried corn fermentation solubles, wherein said dried solubles have been dried to a total moisture content of less than 30% by weight at a temperature not less than 80° F. and not more than 900° F. and wherein said dried solubles enhance ruminal microbial fermentation and increase the amount of microbial protein delivered to the digestive organs of a ruminant when fed to a ruminant as compared to said solubles which have not been dried.

2. The feed additive as claimed in claim 1, further comprising a carrier.

3. The feed additive as claimed in claim 2, wherein said carrier is wheat middlings.

4. The feed additive as claimed in claim 1, further comprising glutamic acid.

5. The feed additive as claimed in claim 1, further comprising a proteolytic, amyalytic or cellulytic enzyme of bacterial or fungal origin.

6. A method for feeding a ruminant, comprising feeding to said ruminant the feed additive of claim 1 in an amount of from 0.5 to 12 pounds per day.

7. The feed additive as claimed in claim 1, wherein said dried solubles are dried glutamic acid fermentation solubles.

8. The feed additive as claimed in claim 1, wherein said dried solubles are dried corn fermentation solubles.

9. The feed additive as claimed in claim 1, wherein said dried solubles are a mixture of dried glutamic acid fermentation solubles and dried corn fermentation solubles.

10. The method as claimed in claim 6, wherein said feed additive comprises said dried glutamic acid fermentation solubles.

11. The method as claimed in claim 6, wherein said feed additive comprises said dried corn fermentation solubles.

12. The method as claimed in claim 6, wherein said feed additive comprises said mixture of dried glutamic acid fermentation solubles and dried corn fermentation solubles.

13. A feed additive for ruminants, consisting of dried glutamic acid fermentation solubles, dried corn fermentation solubles, or a mixture of dried glutamic acid fermentation solubles and dried corn fermentation solubles, wherein said dried solubles have been dried to a total moisture content of less than 30% by weight at a temperature not less than 80° F. and not more than 900° F. and wherein said dried solubles increase rumen microbial fermentation and the amount of microbial protein delivered to the digestive organs of a ruminant when fed to a ruminant as compared to said solubles which have not been dried.

* * * * *